(12) United States Patent
Medved et al.

(10) Patent No.: US 8,924,508 B1
(45) Date of Patent: Dec. 30, 2014

(54) ADVERTISING END-USER REACHABILITY FOR CONTENT DELIVERY ACROSS MULTIPLE AUTONOMOUS SYSTEMS

(75) Inventors: Jan Medved, Pleasanton, CA (US); David Ward, Los Gatos, CA (US); Huw Edward Jones, Blewbury (GB)

(73) Assignee: Juniper Networks, Inc., Sunnyvale, CA (US)

( * ) Notice: Subject to any disclaimer, the term of this patent is extended or adjusted under 35 U.S.C. 154(b) by 298 days.

(21) Appl. No.: 13/341,662

(22) Filed: Dec. 30, 2011

(51) Int. Cl.
    *G06F 15/16*     (2006.01)
    *H04L 29/08*     (2006.01)
    *H04L 29/06*     (2006.01)

(52) U.S. Cl.
    CPC .......... *H04L 29/08072* (2013.01); *H04L 29/06* (2013.01)
    USPC .......................................... 709/217; 709/244

(58) Field of Classification Search
    CPC ................................ H04L 29/00; G06Q 30/00
    USPC ......................................... 709/217, 242–244
    See application file for complete search history.

(56) References Cited

U.S. PATENT DOCUMENTS

| | | | |
|---|---|---|---|
| 5,519,704 A * | 5/1996 | Farinacci et al. ............. | 370/402 |
| 2002/0009079 A1 * | 1/2002 | Jungck et al. ................. | 370/389 |
| 2003/0105865 A1 * | 6/2003 | McCanne et al. ............. | 709/225 |
| 2003/0208472 A1 | 11/2003 | Pham | |
| 2004/0107177 A1 | 6/2004 | Covill et al. | |
| 2004/0196827 A1 | 10/2004 | Xu et al. | |
| 2004/0260755 A1 * | 12/2004 | Bardzil et al. ................ | 709/200 |
| 2005/0175341 A1 * | 8/2005 | Ovadia ............................ | 398/43 |
| 2006/0020684 A1 | 1/2006 | Mukherjee et al. | |
| 2008/0222291 A1 | 9/2008 | Weller et al. | |
| 2008/0304482 A1 | 12/2008 | Grassi et al. | |
| 2009/0190518 A1 | 7/2009 | Kim et al. | |
| 2010/0114867 A1 | 5/2010 | Olston | |
| 2010/0125649 A1 | 5/2010 | Day et al. | |
| 2011/0231515 A1 | 9/2011 | Day et al. | |
| 2012/0144066 A1 | 6/2012 | Medved et al. | |
| 2012/0198022 A1 | 8/2012 | Black et al. | |
| 2012/0198361 A1 | 8/2012 | Ganimasty et al. | |
| 2013/0041972 A1 | 2/2013 | Field et al. | |

OTHER PUBLICATIONS

U.S. Appl. No. 13/110,987, by Jan Medved, filed May 19, 2011.
U.S. Appl. No. 12/861,681, by Satish Raghunath, filed Aug. 23, 2010.
U.S. Appl. No. 12/861,671, by Jan Medved, filed Aug. 23, 2010.
Alimi et al., "ALTO Protocol," draft-ietf-alto-protocol-06.txt, Internet-Draft, Oct. 25, 2010, 65 pp.

(Continued)

*Primary Examiner* — Ebrahim Golabbakhsh
(74) *Attorney, Agent, or Firm* — Shumaker & Sieffert, P.A.

(57) ABSTRACT

In general, techniques are described for advertising end user content delivery reachability by content delivery networks (CDNs) to upstream content serving entities. In one example, a CDN interconnection (CDNI) device of a content serving entity receives a prefix advertisement that specifies a downstream entity and indicates the downstream entity provides content delivery reachability to the network address prefix. A request router of the CDNI device receives a content request that includes a request for content and specifies a network address of an end user device to receive the content, wherein the network address is within a range defined by the network address prefix. The request router selects the downstream entity to serve the content request based at least on the content delivery reachability indication and redirects the content request to the downstream entity.

43 Claims, 7 Drawing Sheets

(56) References Cited

OTHER PUBLICATIONS

Seedorf et al., "Application-Layer Traffic Optimization (ALTO) Problem Statement," Network Working Group, RFC: 5693, Oct. 2009, 14 pp.

Chandra et al., "BGP Communities Attribute," Network Working Group, RFC: 1997, Aug. 1996, 5 pp.

Coppens et al., "Design and Performance of a Self-Organizing Adaptive Content Distribution Network," Network Operations and Management Symposium, 2006, NOMS 2006, 1Oth IEEE/IFIP, Apr. 3-7, 2006, pp. 534,545.

Roh et al., "Design of a Content Replacement Scheme Using the P-based LRFU-k Algorithm in Contents Delivery Networks," Advanced Communication Technology, 2008, ICACT 2008, 10th International Conference on, vol. 3, Feb. 17-20, 2008, pp. 2067,2070.

* cited by examiner

ADVERTISING END-USER REACHABILITY FOR CONTENT DELIVERY ACROSS MULTIPLE AUTONOMOUS SYSTEMS

TECHNICAL FIELD

The invention relates to computer networks and more, specifically, to content delivery using computer networks.

BACKGROUND

Content providers increasingly rely on content delivery networks (CDNs) to distribute content requested by a geographically diverse clientele. Content delivery networks reduce delivery costs, improve performance and robustness, and enhance a quality of experience for end users by caching copies of content in numerous locations to reduce the distance between end users and a given copy of the content.

In general, a CDN includes a distribution system made up of content serving nodes, or "surrogates," that cache copies of content and deliver the content in response to requests from end user devices. The distribution system also distributes content within the CDN, with content typically originating at an origin server and being distributed among the surrogates that are closer, both topologically and geographically, to a service provider edge and therefore to the end users. A request router of the CDN functions as a request reference point for the CDN to end user devices. An end user device sends a content request to the request router, which selects a capable surrogate to handle the content request and then redirects the end user device to the selected surrogate. The end user device reissues the content request directly to the selected surrogate, which delivers the requested content to the end user device.

SUMMARY

In general, techniques are described for advertising end user reachability by content delivery networks (CDNs) to upstream content serving entities for content delivery across multiple autonomous systems. A content service provider (CSP), like a CDN provider, provides to end users a content service that includes delivery of content to the end users in response to content requests. In some cases, a CSP or CDN provider may elect to delegate content request handling for a subset of end users to another CDN, thereby creating a hierarchical relationship between the CSP or CDN provider that is delegating content delivery (the "upstream entity") and the delegated, downstream CDN that then either selects a surrogate for content delivery or delegates content request handling for the subset of users to a still further downstream CDN.

Downstream CDNs advertise end users for which the downstream CDN offers content delivery reachability to upstream entities. That is, a downstream CDN sends identifiers for end users, such as network address prefixes, to one or more upstream CSPs or CDNs to indicate that the downstream CDN offers content delivery services to and is therefore capable of handling content requests for the identified end users on behalf of the upstream entities. In some cases, a downstream CDN may supplement content delivery reachability information with an indication of whether content request handling for the reachable end users is "on-net," i.e., handled by a downstream CDN of the reachable end users' network service provider, or whether content request handling for the reachable end users is "off-net." In this way, a chain of CDNs may propagate content delivery reachability to upstream entities represented in the chain as well as to the top-level upstream entity.

In some examples, a device of a downstream CDN implements a CDN interconnection interface by providing content delivery reachability information to upstream entities using Border Gateway Protocol (BGP) advertisements extended to include one or more prefix cost attributes, such as the aforementioned on-net indication, cost per megabyte, delay (latency), a topological cost, available bandwidth to the end users, and/or other attributes that may affect downstream CDN selection decisions by an upstream entity.

In some examples, a device of a downstream CDN implements the CDN interconnection interface by using an application-layer protocol, such as the Application-Layer Traffic Optimization (ALTO) protocol, to advertise end user content delivery reachability to upstream entities. The ALTO network map provided by a downstream CDN may aggregate the downstream CDN or still further downstream CDNs as a single PID and/or include PIDs for individual surrogates for any of the downstream CDNs. The ALTO network map may additionally include PIDs for end users (e.g., for end user prefixes). The ALTO cost map provided by the downstream CDN describes costs to reach end users represented by PIDs of the ALTO network map from different CDNs and surrogates represented by other PIDs of the ALTO network map. The costs may reflect any of the above-mentioned prefix cost attributes described above with respect to extended BGP advertisements.

The techniques described in this disclosure may provide one or more advantages. For example, providing content delivery reachability for end users by downstream CDNs to an upstream entity may enable the upstream entity to intelligently select a delegate downstream CDN to handle a content request issued by a particular end user. Upstream entities may select the delegate downstream CDN according to any of the prefix cost attributes associated with end users in the reachability information advertised by the downstream CDNs, thereby providing for policy-based request routing that accords with the normative preferences of the upstream entity, whether a CSP or a CDN provider. As another example, in some instances, exposure by a downstream CDN of internal topological cost information for different surrogates of the downstream CDN may allow an upstream entity to directly and intelligently select a particular surrogate. By redirecting the requesting end user directly to the selected surrogate, the upstream entity may avoid an additional layer of redirection by a request router of the downstream CDN.

In one example, a method comprises receiving a prefix advertisement with a content delivery network interconnection (CDNI) device of a content serving entity, wherein the prefix advertisement specifies a downstream entity and indicates the downstream entity provides content delivery reachability to a network address prefix. The method further comprises receiving, with the CDNI device, a content request that includes a request for content and specifies a network address of an end user device to receive the content, wherein the network address is within a range defined by the network address prefix. The method further comprises selecting, with the CDNI device, the downstream entity to serve the content request based at least on the content delivery reachability indication. The method further comprises redirecting the content request from the CDNI device to the downstream entity.

In another example, a method comprises receiving a network address prefix with a content delivery network interconnection (CDNI) device that serves a downstream entity. The method further comprises generating a prefix advertisement with the CDNI device, wherein the prefix advertisement indicates the downstream entity provides content delivery reachability to the network address prefix. The method further comprises sending the prefix advertisement from the CDNI device to a content serving entity.

In another example, a content delivery network interconnection (CDNI) device of a content serving entity includes a control unit having one or more processors, wherein the control unit receives a prefix advertisement, wherein the prefix advertisement specifies a downstream entity and indicates the downstream entity provides content delivery reachability to the network address prefix. A request router of the control unit that receives a content request that includes a request for content and specifies a network address of an end user device to receive the content, wherein the network address is within a range defined by the network address prefix, wherein the request router selects the downstream entity to serve the content request based at least on the content delivery reachability indication and redirects the content request to the downstream entity.

In another example, a content delivery network interconnection (CDNI) device that serves a downstream entity includes a control unit having one or more processors. The control unit receives a network address prefix, generates a prefix advertisement that indicates the downstream entity provides content delivery reachability to the network address prefix, and sends the prefix advertisement to a content serving entity.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
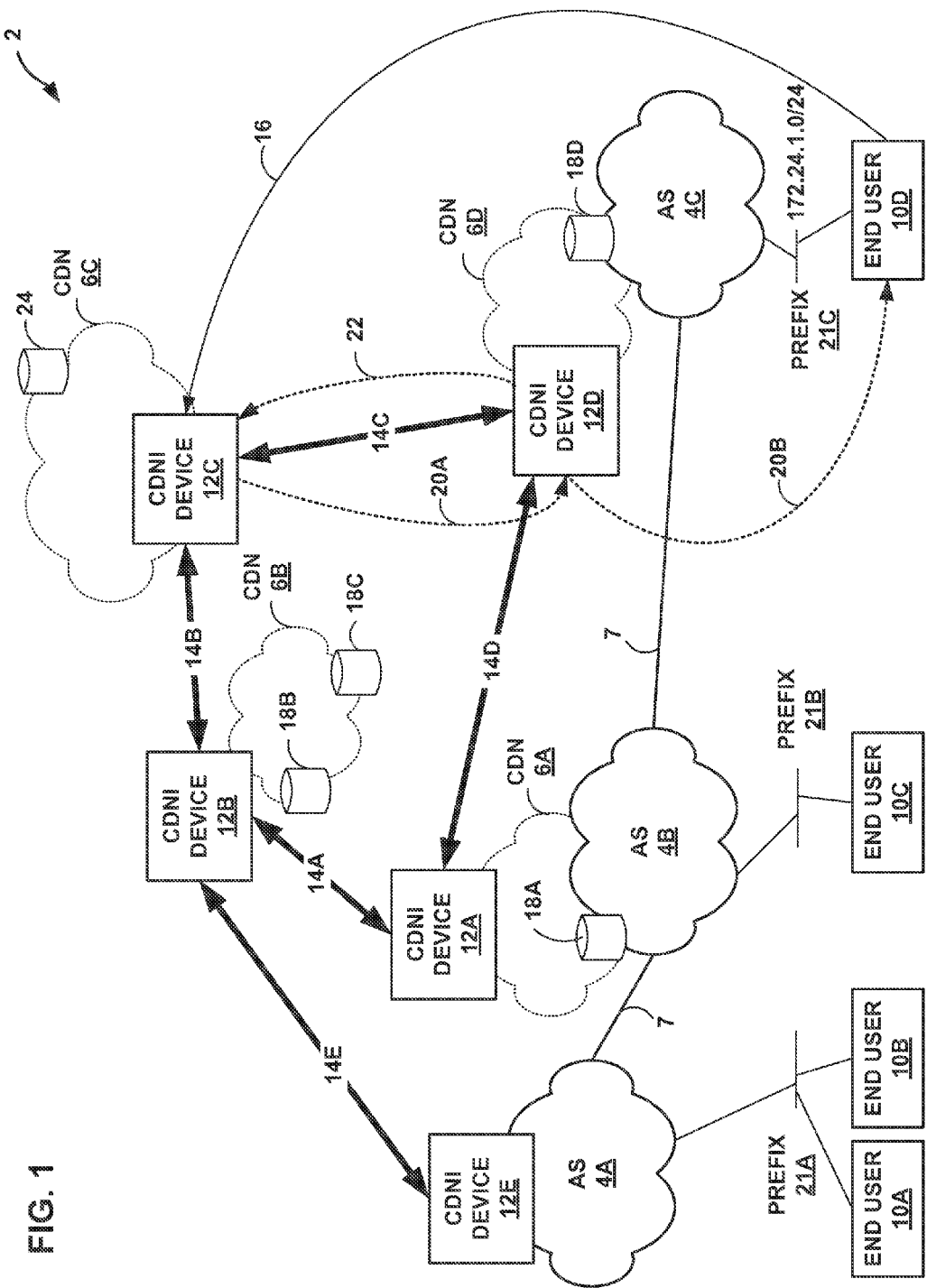
FIG. 1 is a block diagram illustrating a network system in which downstream content delivery networks and autonomous systems advertise end user reachability to upstream entities in accordance with techniques of this disclosure.

FIG. 1 is a block diagram illustrating a network system in which downstream content delivery networks and autonomous systems advertise end user content delivery reachability to upstream entities in accordance with techniques of this disclosure. Network system 2 includes multiple autonomous systems 4A-4C (illustrated as "AS 4A-4C" and collectively referred to herein as "ASes 4") offering network (or topological) reachability to end user devices 10A-10D (illustrated as "end users 10A-10D" and collectively referred to herein as "end user devices 10"). A system or device that offers "network reachability" to an end user device exchanges network packets with the device for delivery to/from the wider network system. External peering links 7 are communication links connecting ASes 4 to one another in the illustrated topology. The term "communication link," as used herein, includes any form of transport medium, wired or wireless, and can include intermediate nodes such as network devices.

Each of ASes 4 run one or more interior gateway protocols (IGPs), such as Open Shortest Path First (OSPF), Routing Information Protocol (RIP), Intermediate System-to-Intermediate System (IS-IS), Interior Gateway Routing Protocol (IGRP), Enhanced IGRP (EIGRP), and Interior Border Gateway Protocol (iBGP), and each of autonomous systems 4 includes a set of one or more routers operating within a single administrative domain according to a routing policy. ASes 4 each include one or more autonomous system border routers (ASBR) (not shown) that execute an exterior routing protocol (e.g., BGP) and peer with one another over peering links 7 to exchange, via the exterior routing protocol, routes that advertise network reachability to prefixes 21A-21C. In various embodiments, each of autonomous systems 4 may represent a service provider network, an enterprise or campus network, or a content access network (CAN). In addition, one or more network service providers or enterprise/campus network administrators may administer any one or more of ASes 4. Accordingly, any one or more of ASes may be alternatively referred to as a network service provider network, or NSP.

Routers of autonomous systems 4 (not shown) execute an Internet Protocol (e.g., IPv4 or IPv6) to route packets from source network addresses to destination network addresses, and each of ASes 4 in this example offers network packet delivery to a network (or subnet) of one or more endpoints identified by a network address prefix that encompasses the network address range defined by the network addresses of endpoints. For example, AS 4A offers packet delivery to/from devices having addresses within the network address range defined by network address prefix 21A, while AS 4C offers packet delivery to/from devices having addresses within the network address range defined by network address prefix 21C.

Network system 2 also includes multiple content delivery networks (CDNs) 6A-6D (collectively, "CDNs 6") each representing a network of interconnected devices that cooperate at layers four through seven (L4-L7) of the Open Systems Interconnection (OSI) model (i.e., the transport layer through the application layer) to deliver content items to any of end users 10 using one or more services. Such content items (hereinafter, "content") may include, for instance, streaming media files, data files, software, domain name system information, documents, database query results, among others. Accordingly, examples of services offered by CDNs 6 may include hyper-text transfer protocol (HTTP), media streaming, advertising, file transfer protocol (FTP), and others. Each of CDNs 6 operates over a network infrastructure (some network infrastructure not shown in FIG. 1) that transports content requests, content data, and content metadata among CDNs 6, between CDNs 6 and ASes 4, and between a content service provider network and CDNs 6.

Network service providers (NSPs), CDN providers, and content service providers (CSPs) deploy CDNs to more efficiently deliver network services, such as Internet Protocol television (IPTV), video on demand (VoD), audio on demand, bulk data download, and other forms of content delivery. In the illustrated example, a CSP deploys the top-level CDN 6C to offer a content service to one or more of end users 10. A content service, in general, encompasses the content delivery functionality of a CDN (partially provided in this example by CDN 6C) but may also provide additional services, such as key distribution and TV program guides. The CSP may own or license content and stores such content on origin server 24 for delivery by origin server 24 or replication to other CDNs 6C for delivery by any of surrogates 18A-18D (collectively, "surrogates 18"). In some examples, a CDN provider deploys the top-level CDN 6C for use by one or more CSPs, for instance. In some examples, the CSP may deploy origin server 24 or other content serving entity without deploying a full CDN (e.g., CDN 6C).

Origin server 24 is a master repository for the CSP, and hence for associated CDN 6C, to store all content made available to end users 10 as part of the content service provided by the CSP. Origin server 24 may include one or more data servers, web servers, application servers, databases, computer clusters, mainframe computers, and any other type of server, computing element, and/or database that may be employed by the CSP to facilitate the delivery of content from origin server 24 to surrogates 18 and/or directly to end users 10. In examples where a CDN provider deploys CDN 6C, the CDN provider may operate CDN 6C by receiving and storing content provided by one or more CSPs to origin server 24.

Continuing the description of CDNs 6, the service provider for autonomous system 4B deploys CDN 6A, and the service provider for autonomous system 4C deploys CDN 6D. That is, the same entity (e.g., the service provider) administers both one of CDNs 6 and an associated one of ASes 4. The service provider for autonomous system 4A does not, in this example, deploy a CDN but is instead served by an over-the-top (OTT) CDN 6B. A CDN is an OTT CDN when administered by a different entity than the autonomous system (or NSP) to which end users 10 of the CDN attach to access the network. In some instances, CDN providers lease or purchase bandwidth and/or co-location facilities from network ASes 6.

Each of CDNs 6 includes at least one of surrogates 18 and one of CDN Interconnection (CDNI) devices 12A-12E (collectively, "CDNI devices 12"). Surrogates 18 store content made available by the CSP administering AS 6C and/or the CDN provider of the respective CDN 6 to end users 10, to other devices of the respective CDN 6, and/or to other CDNs 6. Surrogates 18 serve the content to requesting devices using, for example, a transmission control protocol (TCP) or user datagram protocol (UDP) session operating over intermediate devices of CDNs 6 (intermediate devices not shown for simplicity). CDN providers administer surrogates 18 to optimize content delivery using load balancing techniques, caching, request routing, and/or content services. Each of surrogates 18 may include one or more data servers, web servers, application servers, databases, computer clusters, mainframe computers, and any other type of server, computing element, and/or database that may be employed by the respective CDN provider to facilitate the provision of content. In some examples, the servers and/or databases may include "blades" or other cards that are inserted into large racks. The racks may provide a common backplane or switch fabric to interconnect the various servers and/or databases to one another as well as to a router or other network device of one of ASes 4. That is, any of surrogates 18 may be a service blade insertable within an associated router of one of ASes 4. Any of surrogates 18 may aggregate or otherwise represent multiple caches that store content for different content providers or vendors.

Each of CDNI devices 12 may represent a server, router, other computing element or component thereof that distributes content delivery reachability information and/or performs request routing in accordance with techniques described herein. CDNI devices 12 may include DNS servers, other application-layer protocol (e.g., HTTP) servers or protocol speakers, application-layer traffic optimization servers and/or clients, and may in some instances execute routing protocols to receive, process, and advertise routing and content delivery reachability information.

CDNs 6 may cache content closer to the edge of a network (i.e., closer to end users 10) to reduce transit delivery time and also to reduce network bandwidth usage for content delivery. In various examples, each of CDNs 6 may include a plurality of surrogates geographically dispersed to serve end users 10 that may be geographically diverse (e.g., located a significant distance from one another). Accordingly, costs to various surrogates 18 may differ by end users 10. Surrogates 18 may thus mirror a subset of the content available from origin server 24, where the "set" of content available from origin server 24 refers to the content files available to end users 10 from the content service provider administering CDN 6C in this example, though each of surrogates 18 may provide different services and data content than that provided by the surrogates.

End users 10A-10D (collectively, "end users 10") access ASes 4 to issue content requests to, e.g., surrogates 18 or origin server 24 located in any of autonomous systems 4, and to receive application-related content for applications hosted by end users 10. Each of end users 10 may represent, for example, a workstation, desktop computer, laptop computer, cellular or other mobile device, Personal Digital Assistant (PDA), gaming console, television set-top box, or any other device capable of accessing a computer network via a wireless and/or wired connection. Each of end users 10 may be associated with a subscriber (e.g., a human). Applications that access content services provided by CSP/CDN providers operating CDNs 6 may alternatively be referred to as "user agents."

Content delivery networks 6 use application-layer protocols for content distribution and typically make use of request routing techniques to direct application-layer client requests from end users 10 to associated surrogates 18, where "request routing" refers to selecting one of surrogates 18 with which to service a client request and directing the client request to the selected cache node. The task of directing end user requests to cache nodes is alternately referred to as request routing, content routing or content redirection (hereinafter, "request routing"). Content delivery networks 6 may employ one or more of a variety of request routing techniques, including Domain Name Service (DNS) request routing and other forms of application-layer request routing.

In the case of DNS request routing, when one of end users 10 requests a content file through one of ASes 4, the AS forwards a DNS request to a domain name server that is configured to operate as a redirector, or "request router," for one of CDNs 6. In the illustrated example, CDN Interconnection (CDNI) devices 12 operate as request routers for associated CDNs 6. For example, CDNI device 12C operates as a request router for CDN 6C. The DNS-based request router receives and resolves the domain name to select one of surrogates 18 to serve the requested content, then returns the network address for the selected one of surrogates 18 to the requesting one of end users 10 (typically via a local DNS server of the AS 4 (not shown) that provides network access to the requesting one of end users 10), which requests and receives the content from the selected one of surrogates 18. In some cases however, as described in further detail below, the request router may delegate the content request to another one of CDN 6s. In some examples, providers of CDNs 6 deploy one or more request routers in separate appliances to use information received by CDNI devices 12 for the respective CDNs 6.

In instances of other forms of application-layer request routing, when one of end users 10 requests a content file through one of ASes 4 using, for example, Hyper-Text Transfer Protocol (HTTP) or Real-Time Streaming Protocol (RTSP), the autonomous system forwards the request to a request router of one of CDNs 6. Again, CDNI devices 12 operate as request routers for associated CDNs 6. The request router selects one of surrogates 18 to satisfy the request. The request router returns the network address for the selected one of surrogates 18 to the requesting one of end users 10, which requests and receives the content from the selected one of surrogates 18. As in the case of DNS-based request routing, the request router may in some cases delegate the content request to another CDN 6.

In some instances, a provider of one of CDNs 6 may enter into agreements with other providers of one or more of CDNs 6 to delegate content delivery in accordance with a content service to a subset of end users 10 that engage the content service offered by the provider. For example, a delegating provider (which administers one of CDNs 6) provides a content service to some or all of end users 10. The delegating provider may delegate the responsibility to serve at least a portion of content requests, as well as the content requests themselves, to a provider that deploys a delegated one of CDNs 6. The agreements may specify contractual duties of participating providers in what is known as a service level agreement (SLA), which may define the end users 10 for which a delegated provider is to service content requests, a requisite service level that is to be applied by the delegated provider, and so on.

Delegation in this manner defines a hierarchical relationship among CDNs 6. One of CDNs 6 that delegates content requests is an "upstream entity" to the "downstream entity" that may be one of ASes 4 or another one of CDNs 6 and is delegated content requests from the upstream entity. The terms "upstream entity" and "downstream entity" may alternatively refer to the associated CSP, CDN provider, or NSP associated with the network that is the entity (e.g., one of CDNs 6 or ASes 4). A "content serving entity" refers to any of CDNs 6 or, in some examples, a CSP network or data center that serves content to end users 10. Downstream entities and upstream entities may be content serving entities. Downstream entities that are ASes 4 may not serve content to end users 10 in some instances. Rather, such downstream entities provide content delivery reachability to end users 10 for upstream entities that serve the content. The upstream entity can be a CSP or one of CDNs 6, while the downstream entity can be one of CDNs 6 or one of ASes 4. A CDN 6 may be both a downstream CDN and an upstream CDN for one or more of end users 10. That is, there may be a chain of delegation agreements cascading from top-level providers to intermediate-level CDN providers to lower-level network service providers. In this way, downstream entities may deliver content on behalf of upstream entities that receive corresponding content requests.

Network system 2 illustrates a number of possible delegation agreements that define different hierarchical relationships among CDNs 6. For example, to increase content delivery reachability to end users 10 that may be geographically distant, cost prohibitive, or even logically unreachable due to policies defined by providers of CDNs 6/ASes 4 in network system 2, the CSP that operates CDN 6C may delegate responsibility for serving content requests for a subset of end users 10 to any of the other CDNs 6. In this way, the CSP may avoid extending CDN 6C (and associated capital expenditures) and/or entering into direct agreements with each of the providers of CDNs 6 while effectively addressing the content service requirements to end users 10. In the case of end users 10C, 10D, these delegations by the CSP that operates CDN 6C may enable the CSP to provide "on-net" delivery, i.e., delivery from the one of ASes 4 that provides network access to the end user. Because the autonomous system that provides network access to an end user typically includes network devices topologically closer to the end user, on-net delivery is often more efficient than delivery off-net by an OTT CDN or by a CDN established by an NSP associated with a different autonomous system. In the illustrated example, the CSP that operates CDN 6C delegates responsibility for servicing content requests to CDN 6B and CDN 6D, as shown by respective CDN interconnection (CDNI) interfaces 14B, 14C. CDN 6C is thus upstream to CDN 6B and CDN 6D.

As another example, the CDN provider that deploys CDN 6B delegates content request service responsibility for prefix 21B (e.g., end user 10C) to CDN 6A, as shown by CDNI interface 14A. As a result, CDN 6B is both an upstream entity (with respect to CDN 6A) and a downstream entity (with respect to CDN 6C) for content requested by end user 10C. The CDN provider that deploys CDN 6B also has a CDNI interface 14E to receive content delivery reachability information from AS 4A. Because CDN 6B is delegated content request service responsibility from the CSP that operates CDN 6C and also delegates content request service responsibility to the entity that operates CDN 6A, CDN 6C and CDN 6B and CDN 6A define a delegation chain from a top-level CSP to a lower-level NSP that operates CDN 6A and AS 4B.

As another example, respective NSPs for AS 4B and AS 4C operate independent CDN 6A and CDN 6D. To increase reachability and efficiently deliver content, the NSPs may federate and agree to serve end users 10 that roam among the ASes 4B, 4C. For example, end user 10D served by AS 4C and CDN 6D may roam to access network services by AS 4B. Because ASes 4B, 4C are federated, the NSP for AS 4B may serve content requests from roaming end user 10D using CDN 6A. As a result, AS 4B may provide on-net content delivery to end user 10D despite not directly contracting to provide network services to end user 10D. CDNs 6A, 6D establish CDNI interface 14D to route requests and provide content delivery reachability information.

In accordance with techniques of this disclosure, downstream entities advertise reachable prefixes 21 to upstream entities of other autonomous systems using CDNI interfaces 14 to advertise content delivery reachability and, in some instances, costs to prefixes 21 from the downstream entities. As a result, downstream entities may expose prefixes 21 for which the downstream entities are capable of delivering content and, in some instances, provide additional metrics that may improve selection, by upstream entities of different autonomous systems, of downstream entities to satisfy content requests from end users 10. The exposed prefixes 21 and costs may be hidden from or otherwise difficult to obtain by upstream entities using conventional underlying border routing protocols due to the nature of autonomous systems and aggregation as reachability information for the autonomous systems is advertised.

Pairs of CDNI devices 12 implement and use CDNI interfaces 14 to communicate content delivery reachability information and, in some cases, route content requests to downstream entities according to techniques described herein. For example, CDNI device 12E of AS 4A communicates a representation of prefix 21A to CDNI device 12B using CDNI interface 14E to indicate AS 4A provides content delivery reachability to devices having a network address that is within a range defined by prefix 21A (e.g., end users 10A, 10B). As another example, CDNI device 12A of CDN 6A/AS 4B communicates a representation of prefix 21B to CDNI device 12B using CDNI interface 14A to indicate AS 4B provides content delivery reachability to devices having network addresses that are within a range defined by prefix 21B (e.g., end users 10C). CDNI devices 12 for downstream entities may further indicate, together with the content delivery reachability information, whether the downstream entity provides on-net delivery to the reachable prefixes. In the illustrated example, AS 4A does not provide on-net delivery to prefix 21A, while CDN 6A/AS 4B does provide on-net delivery to prefix 21B.

CDNI devices 12 may aggregate prefixes 21 advertised as reachable by downstream entities into an aggregated prefix representation and advertise the aggregated prefix representation using one or more CDNI interfaces 14. In the illustrated example, CDNI device 12B aggregates prefixes 21A, 21B received using respective CDNI interfaces 14E, 14A into an aggregated prefix representation. CDNI device 12B may then advertise the aggregated prefix representation to CDNI device 12C using CDNI interface 14B.

Some of CDNI devices 12 additionally route content requests using content delivery reachability information received from downstream entities using CDNI interfaces 14. For example, CDNI device 12B having received a representation of prefix 21B in CDNI interface 14A may redirect content requests to CDN 6A, more specifically, to CDNI device 12A or surrogate 18A of CDN 6A because CDN 6A provides on-net content delivery to prefix 21B. Having also received a representation of prefix 21A in CDNI interface 14E and an indication that AS 4A does not provide on-net delivery of content to prefix 21A, CDNI device 12B may redirect content requests from end users 10A, 10B to either of surrogates 18B, 18C of CDN 6B that provides off-net delivery of content to prefix 21A. In this way, CDNI devices 12 of upstream CDNs 6 use CDNI interfaces 14 to route content requests to CDNI devices 12 of downstream CDNs 6.

In the illustrated example, CDNI device 12D advertises content delivery reachability information, including a representation of prefix 21C to CDNI device 12C, in prefix advertisement 22 sent via CDNI interface 14C. Prefix advertisement 22 may also include data indicating CDN 6D provides on-net delivery of content to prefix 21C. End user 10D subsequently issues content request 16 to CDNI device 12C deployed by the content service provider associated with CDN 6C. Because CDN 6D provides on-net delivery to prefix 21C including end user 10D, CDNI device 12C delegates content request 16 to CDNI device 12D using redirect message 20A. Redirect message 20A may in some examples be implemented as part of CDNI interface 14C. In some examples, redirect message 20A may represent a DNS A/AAAA record to CDNI device 12D. In some examples, redirect message 20A represents an HTTP 302 redirect message to end user 10D, which causes end user 10D to reissue content request 16 to CDNI device 12D.

CDNI device 12 may select surrogate 18D of CDN 6D to serve content request 16. CDNI device 12D may redirect content request 16 to surrogate 18D using redirect message 20B, which may represent a DNS reply or HTTP 302 redirect message. Upon receiving redirect message 20B, end user 10D may connect directly to surrogate 18D to request and receive the requested content directly from surrogate 18D.

In some examples, CDNI devices 12 implement prefix reachability advertisements for CDNI interfaces 14 using Border Gateway Protocol (BGP) or another exterior routing protocol. For example, CDNI devices 12 may establish BGP peering sessions with one another. A CDNI device 12 for a downstream entity may then send one or more BGP UPDATE messages that include prefixes reachable by the downstream entity to a peer CDNI device 12 for an upstream entity. BGP peering sessions for CDNI interfaces 14 may be established out-of-band from the routing plane of network system 2 to mitigate the possibility of leaking content delivery reachability information for CDNs 6 into BGP routing tables for the network. In this way, CDNI devices 12 may maintain a separation between the network layer (layer three (L3) of the OSI model) and content delivery network layers (i.e., L4-L7). In some examples, however, one or more of CDNI devices 12 may represent network routers and send BGP UPDATE messages in-band with a flag or other indicator that the BGP UPDATE messages include content delivery reachability information for content delivery network content request delegation. As a result, the receiving CDNI devices 12 or any routers that receive the BGP messages do not install the routes (for the reachable prefixes) to the BGP routing tables.

In some examples, CDNI devices 12 implement prefix reachability advertisements for CDNI interfaces 14 using an application-layer traffic optimization protocol, such as the Application-Layer Traffic Optimization (ALTO) protocol. Downstream NSPs or CDN providers may provide an Application-Layer Traffic Optimization (ALTO) protocol service to provide guidance to upstream entities (more specifically, to CDNI devices 12 of upstream entities) regarding selection of an origin server, a particular one of surrogates 18, or a downstream entity (more specifically, one of CDNI devices 12 for a downstream entity) for content request delegation. The ALTO service may provide information that incorporates provider preferences with regard to network resources to influence network resource consumption patterns while maintaining or improving application performance.

In some examples, an ALTO server of the CDNI device 12 for an entity (i.e., one of CDNs 6 and/or ASes 4) receives content delivery reachability information for the entity, which the ALTO server uses to generate a network map. The ALTO server also generates a corresponding cost map for the network map using, for example, topology information that may include traffic engineering (TE) information and SLAs with other providers. The ALTO service and ALTO protocol is described in further detail in J. Seedorf et al., RFC 5693, "Application-Layer Traffic Optimization (ALTO) Problem Statement," Network Working Group, the Internet Engineering Task Force draft, October 2009; and R. Alimi et al., "ALTO Protocol: draft-ietf-alto-protocol-06.txt," ALTO Working Group, the Internet Engineering Task Force draft, October 2010, each of which is incorporated herein by reference in its entirety.

For example, the ALTO server of the CDNI device 12 for the entity may be configured by an NSP or CDN provider with prefixes or receive prefixes in a prefix reachability advertisement (e.g., a BGP UPDATE message or IGP advertisement). The ALTO server arranges the prefixes into a network map that specifies a set of topological groupings, or "PIDs," defined by the ALTO server for at least a portion of the network. A particular PID within a network map may represent a single device or device component, a collection of devices such as a network subnet identified by a network address prefix, a CDN 6 and/or AS 4, or some other grouping. A cost map for a corresponding network map may reflect a combination of topological costs and/or provider preferences. The cost map specifies costs respecting inter-PID content delivery costs for connections among the various PIDs of the network map. That is, for each pair of PIDs in the network map, the cost map specifies a content delivery cost between respective devices represented in each of the member PIDs of the PID pair. In some instances, where a first member PID of a PID pair in the network map represents devices that are not reachable from the second member PID of the PID pair, the cost specified in the cost map from the first member PID to the second member PID may be infinite or, in some cases, empty. Provider preferences may correspond to SLAs with other providers or may be received from other providers in an ALTO cost map received from a downstream entity. Accordingly, provider preferences may include price per megabyte or other transport costs, for example. Topological costs may include traffic engineering information such as bandwidth availability, delay (latency), and path bandwidth, among other cost types.

CDNI devices 12 upstream to the associated entity send ALTO requests to the ALTO server to obtain the network map and the cost map. Using the network map and cost map provided by an ALTO server of a downstream CDNI device 12, a CDNI device 12 of an upstream entity may select serving resources to minimize costs, as specified by the ALTO maps, between content requesting end users 10 and available resources of the upstream entity or downstream CDNs. When, for instance, CDNI device 12C receives a DNS query from one of end users 10, the CDNI device 12C uses one or more cost maps provided by CDNI device 12B and/or CDNI device 12D to select a lowest-cost node at which to direct the DNS query for the requesting end user 10, where the determined node may be a CDNI device 12 of downstream CDN 6 (which may perform additional redirection), one of surrogates 18, or origin server 24. CDNI device 12C redirects the DNS query to the determined node for the subscriber and returns a network address for the determined node. In this manner, the techniques may allow CDN providers and CSPs to improve content delivery reachability and serving node selection among CDNs.

Figure 2:
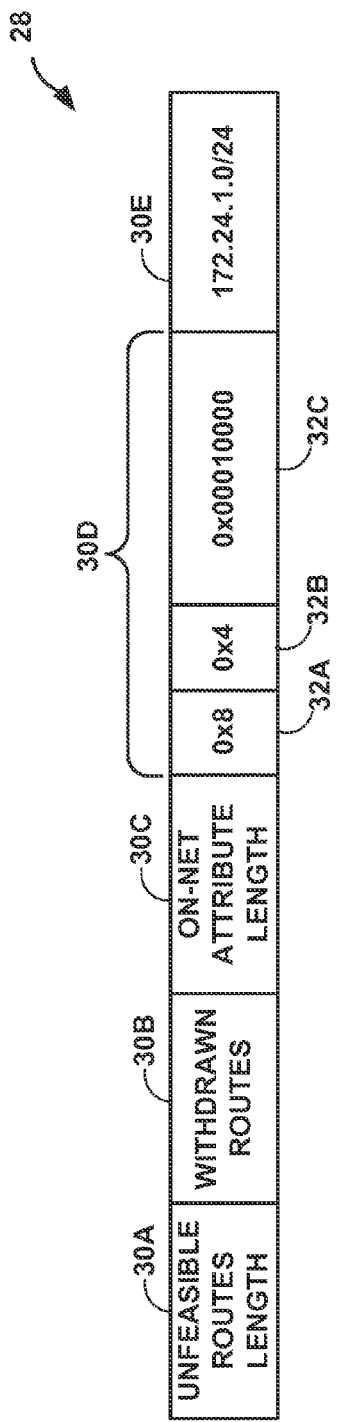
FIG. 2 is a block diagram illustrating an example embodiment of a payload of a Border Gateway Protocol UPDATE message generated and sent by a downstream entity to advertise reachability information for end users in accordance with techniques described herein.

FIG. 2 is a block diagram illustrating an example embodiment of a payload of a BGP UPDATE message generated and sent by a downstream entity to advertise content delivery reachability information for end users. For ease of illustration, a corresponding BGP header is not shown in FIG. 2. BGP UPDATE payload 28 may be an example payload of prefix advertisement 22 of FIG. 1. Pairs of CDNI devices 12 of FIG. 1 may establish BGP peering sessions to exchange BGP UPDATE messages. In some examples, one or more CDNI devices 12 may include community policies that specify, for one or more routes advertised by CDNI devices 12, community values to be set by CDNI devices 12 for community attributes of the routers. In general, a community attribute identifies a prefix reachable using an advertised route as having some quality in common with other prefixes in a network. Including community attributes with advertised routes enables BGP peers to group prefixes and enact routing policies specific to the group of prefixes. A community attribute value is typically a 32-bit integer or an autonomous system number combined with a 32-bit integer. In some instances, community policies may specify community values for extended community attributes. Additional information regarding the BGP community attribute is described in further detail in R. Chandra et al., RFC 1997, "BGP Communities Attribute," Network Working Group, the Internet Engineering Task Force, August, 1996, the entire content of which is incorporated by reference herein. As described further with respect to FIG. 4, an administrator or software agent may add, modify, and delete community policies of CDNI devices 12.

A CDNI device 12 that generates a BGP UPDATE message that includes BGP UPDATE payload 28 may include a community policy that directs the CDNI device 12 to incorporate, into BGP UPDATE payload 28, a community attribute value that identifies prefix 172.24.1.0/24 (included as a value in subfield 30E) as being on-net for the CDN or autonomous system served by the CDNI device 12.

BGP UPDATE payload 22 includes subfields 30A-30E. Subfields 30A and 30B specify a total length and identify any withdrawn routes, respectively. Subfield 30C specifies a total length of attributes of type-length-value (TLV) subfield 30D. In the illustrated embodiment, subfield 30D includes one TLV entry of type 32A, length 32B, and value 32C. Type 32A having value 0x8 and length 32B having value 0x4 indicates a four byte community attribute value. However, these values are merely for exemplary purposes. In this instance, value 32C is 0x00010000, an on-net indicator community attribute value that, in this example, indicates Network Layer Reachability Information (NLRI) in subfield 30E includes a destination prefix that encompasses end user devices that are reachable from a CDN established by an NSP to serve end user devices that attach to the NSP to receive services. Subfield 30E includes NLRI that includes prefix 21C of FIG. 1. In some examples, subfield 30D may include an extended community attribute to specify whether the prefix in subfield 30E is on-net. In some examples, the prefix is subfield 30E is off-net. In such examples, value 32C may be 0x00010001. In some examples, BGP UPDATE payload 28 includes a newly-defined attribute type to indicate whether the prefix in subfield 30E is on-net.

In some examples, BGP UPDATE payload 22 may include additional prefix cost attributes that specify values for other content delivery parameters, such as cost per megabyte, delay (latency), a topological cost, available bandwidth to the end users, and/or other attributes that may affect downstream CDN selection decisions by an upstream entity. These additional prefix cost attributes may be represents in BGP UPDATE payload 22 using any of the attributes types described above (e.g., community or extended community attributes).

Figure 3:
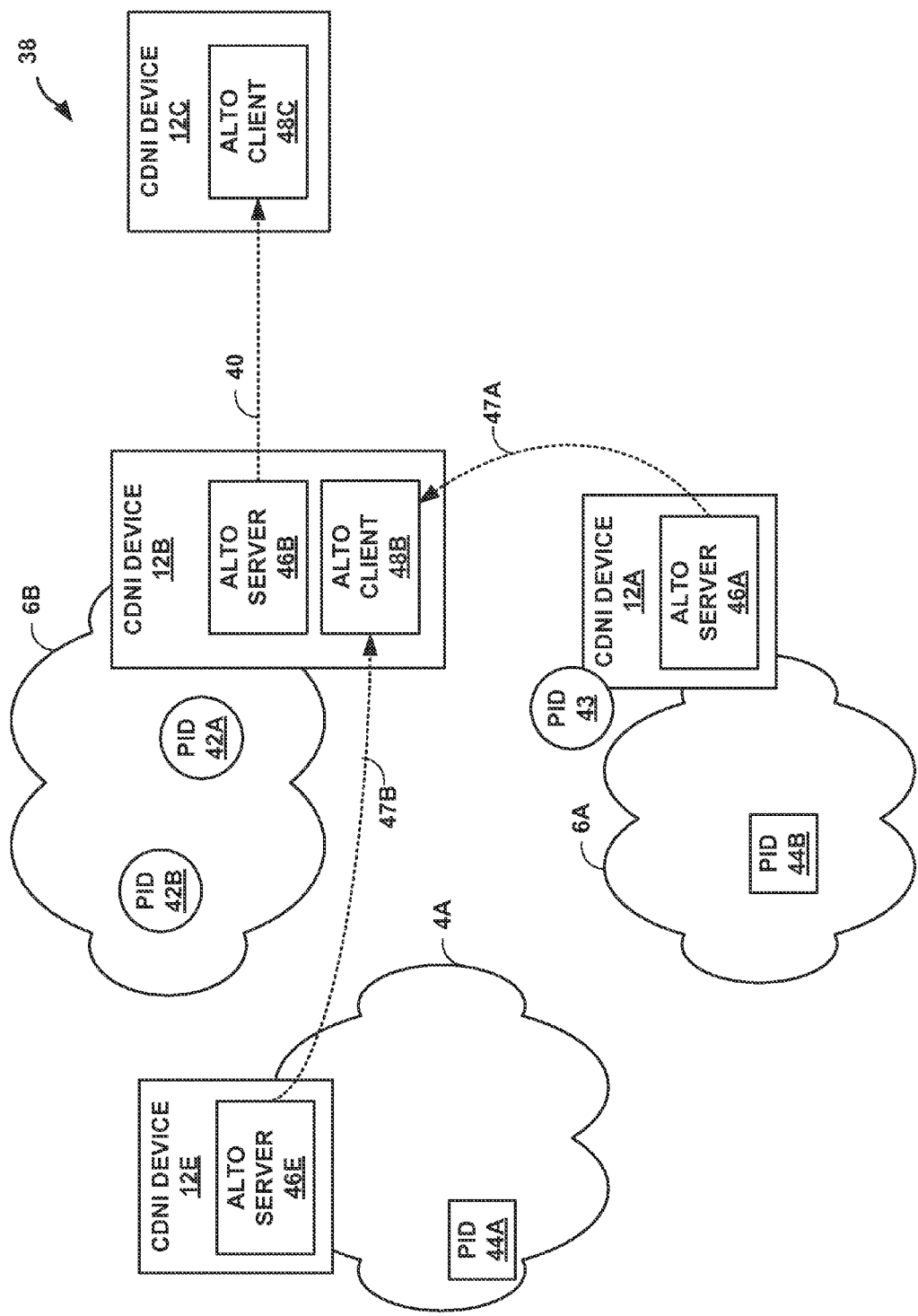
FIG. 3 is a block diagram illustrating a network system having content delivery network interconnection (CDNI) devices that advertise reachability and cost information to end user devices according to techniques described herein.

FIG. 3 is a block diagram illustrating a network system having CDNI devices that advertise content delivery reachability and cost information to end user devices according to techniques described herein. Network system 38 is a representation of a portion of network system 2 of FIG. 1 and includes AS 4A, CDN 6A, CDN 6B as entities that communicate using CDNI interfaces. In particular, CDNI devices 12A, 12B, 12C and 12E of these entities communicate using an ALTO service to communicate content delivery reachability information to end user devices to upstream entities. End user devices and surrogates are represented in network system 2 as PIDs, with end user devices being aggregated and illustrated as square prefix PIDs 44A-44B and surrogates and request routers being illustrated as circular surrogate PIDs 42A-42B and request router PID 43. Prefix PID 44A, for example, may represent prefix 21A including end user 10A and end user 10B of FIG. 1. Surrogate PID 42A may represent surrogate 18B of FIG. 1.

Each of AS 4A, CDN 6A, and CDN 6B includes a CDNI device 12 having an ALTO server that provides content delivery reachability and cost information to an ALTO client of a CDNI device 12 of an upstream entity. For example, CDNI device 12E includes ALTO server 46E that provides an ALTO service to ALTO client 48B of CDNI device 12B. Similarly, CDNI device 12B includes ALTO server 46B that provides an ALTO service to ALTO client 48C of CDNI device 12C.

ALTO servers 46 may perform network map generation techniques to aggregate prefixes (not shown in FIG. 3) served by associated entities into one or more of prefix PIDs 44 and assemble the PIDs into respective ALTO network maps ("network maps"). As illustrated, for instance, ALTO server 46A aggregates prefixes served by CDN 6A into PID 44B. In some examples, ALTO server 46 receives internally advertised routing information and uses the routing information to dynamically generate a network map for the ALTO service. Further details regarding dynamically generating network maps is found in Medved et al., U.S. patent application Ser. No. 13/110,987, entitled "DYNAMICALLY GENERATING APPLICATION-LAYER TRAFFIC OPTIMIZATION PROTOCOL MAPS," filed May 19, 2011, the entire contents of which are incorporated herein by reference.

PIDs may be aggregated at different levels of granularity according to CDN provider or NSP policies. For example, a provider may in some instances seek to avoid exposing its internal topology to other providers. In other instances, the provider may seek to improve surrogate selection by exposing its network to request routers. The CDN provider for CDN 6B, for instance, exposes different surrogates to CDNI device 12C using surrogate PIDs 42A, 42B. CDNI device 12C may then select the corresponding surrogate for one of surrogate PIDs 42A, 42B to select the lowest cost surrogate to service a content request. However, the CDN provider for CDN 6A directs ALTO server 46A to aggregate CDN 6A into request router PID 43 corresponding to CDNI device 12A, which may then be selected by upstream entities to handle redirected content requests. CDNI device 12A may receive a content request issued by an end user represented by prefix PID 44B redirected from CDNI device 12B or CDNI device 12C according to the network map provided by ALTO server 46A. CDNI device 12A may then select a surrogate of CDN 6A (e.g., surrogate 18A of FIG. 1) to service the content request.

In this example, ALTO servers 46 additionally perform cost map generation techniques to produce respective ALTO cost maps ("cost maps") that include, where possible, costs between surrogate PIDs 42 or request router PID 43 and prefix PIDs 44 that are associated with the network maps produced by the ALTO servers 46. For example, ALTO server 46A may generate a cost map that specifies zero cost between request router PID 43 and prefix PID 44B to indicate request router PID 43 is on-net for prefix PID 44B (e.g., CDN 6A and AS 4B of FIG. 1 are operated by the same entity). ALTO server 46E, however, advertises only content delivery reachability using a network map because AS 4A does not include any surrogates and CDNI device 12E does not include a request router in this example. In this way, each of ALTO servers 46 produces local network and local cost maps that represents a topology of the entity served by the ALTO server as well as any downstream entities reachable from the entity. In some cases, ALTO servers 46 may produce multiple cost maps for different cost attributes, e.g., on-net, delay, bandwidth, and price/MB delivered. The upstream entity may apply policies to different combinations of the multiple costs maps to select a surrogate or downstream request router.

ALTO servers 46A, 46E send their respective, local network and cost maps to ALTO client 48B of CDNI device 12B in respective upload messages 47A, 47B. Any of upload messages 47A, 47B may represent an incremental or a complete update to a network and/or cost map. Incremental updates to ALTO network and cost maps are described in further detail in Raghunath et al., U.S. patent application Ser. No. 12/861,681, entitled "APPLICATION-LAYER TRAFFIC OPTIMIZATION SERVICE MAP UPDATES," filed Aug. 23, 2010, the entire contents of which are incorporated herein by reference.

Figure 5:
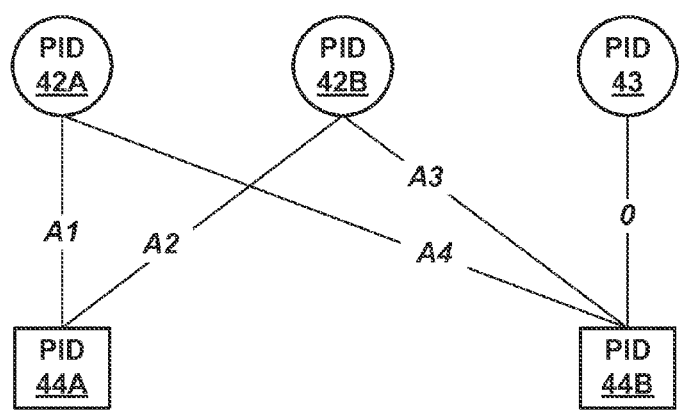
FIG. 5 is a block diagram illustrating an example graph that represents a combined application-layer traffic optimization network map and cost map for a network system, generated in accordance with techniques described herein.

ALTO server 46B generates a local network and cost map for CDN 6B. Responsive to receiving local network and cost maps with ALTO client 48B from ALTO servers 46A, 46E, ALTO server 46B may incorporate the topology and cost information therein to the network and cost map for CDN 6B that is an upstream entity to the downstream AS 4A and downstream CDN 6A. In other words, ALTO server 46B may correlate perspectives from each of the local network and cost maps received from ALTO servers 46A, 46E, as well as the perspective of CDN 6B, into a single, consolidated network and cost map for CDN 6B. An example representation of this consolidated network and cost map is illustrated in FIG. 5. ALTO server 46B then sends this network and cost map to ALTO client 48C in upload message 40, which may represent an incremental or a complete update to a network and/or cost map.

CDNI device 12C may perform further consolidation (to include a PID for origin server 24 of FIG. 1, for example) to generate a master ALTO network and cost map for the CSP. When CDNI device 12C receives a content request from an end user having a network address included within the prefixes represented by any of prefix PIDs 44, CDNI device 12C identifies a lowest cost surrogate PID 42 or request router PID 43 to service the content request and redirect the content request to the identified PID. As a result, the CSP may improve selection of surrogates for content requests.

Figure 4:
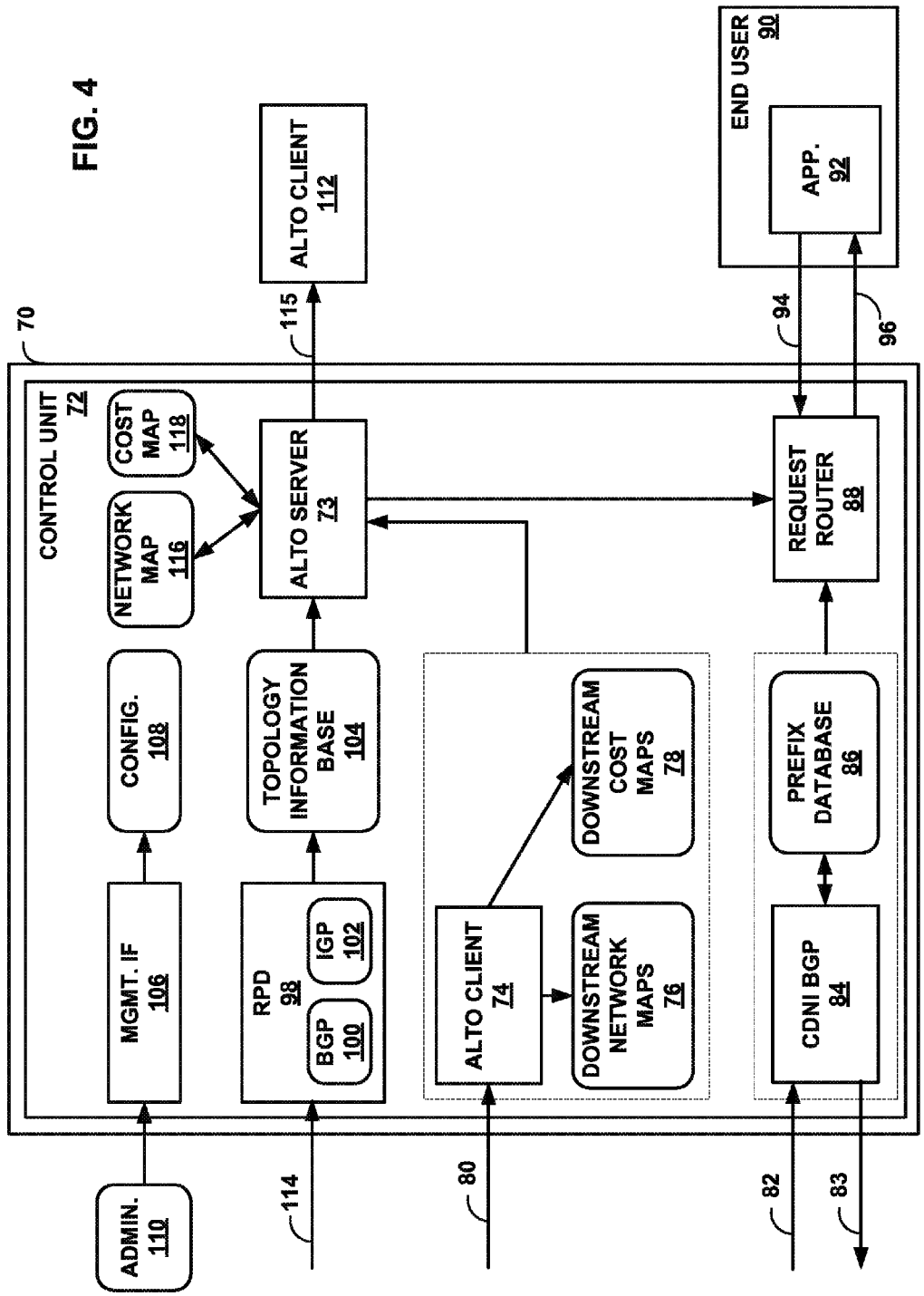
FIG. 4 is a block diagram illustrating an example CDNI device that advertises end user reachability and cost information and routes content requests according to techniques described in this disclosure.

FIG. 4 is a block diagram illustrating an example content delivery network interconnection (CDNI) device that advertises end user content delivery reachability and cost information and routes content requests according to techniques described in this disclosure. CDNI device 70 may represent an example instance of any of CDNI devices 12 of FIG. 1. CDNI device 70 may include a server, router network controller, network switch, or other computing device or appliance that includes one or more processors that provide an operating environment for one or more software modules for advertising end user content delivery reachability and cost and routing content requests in accordance with the described techniques. For purpose of clarity, components such as a microprocessor, memory, keyboard, display, an operating system, network drivers and other components commonly found in such a computing device or appliance are not shown in FIG. 4. In some examples, CDNI device 70 includes a router that includes one or more services units to apply content delivery reachability and request routing services as described herein. The services units may be distributed over one or more service cards or blades (not shown) that are inserted into rack slots of a router. The services units may communicate with the routing plane across a backplane or across a network link that enables the services to passively peer with routing daemons executing routing protocols within the routing plane of the router included within CDNI device 70.

Control unit 72 of CDNI device 70 provides an operating environment for executing modules, which in the illustrated example include management interface 106, routing protocol daemon 98, ALTO server 73, ALTO client 74, CDNI BGP listener 84, and request router 88. Control unit 72 may include one or more processors (not shown), including one or more microprocessors, digital signal processors (DSPs), application specific integrated circuits (ASICs), field programmable gate arrays (FPGAs), or any other equivalent integrated or discrete logic circuitry, as well as any combinations of such components, to execute modules that implement the functionality described herein. CDNI device also includes one or more network interfaces (not shown in FIG. 4 for ease of illustration).

In this example, CDNI device 70 may both advertise end user content delivery reachability and cost as well as route content requests received from an end user. In some instances, CDNI device 70 may perform either of these functions. CDNI device 70 may be a CDNI device for an upstream and/or downstream entity. In addition, CDNI device 70 in this example performs end user content delivery reachability learning and advertisement using BGP-based techniques as well as ALTO-based techniques. In some instances, CDNI device 70 may perform either but not both of these techniques.

Routing protocol daemon (RPD) 98 of control unit 72 executes BGP 100 and IGP 102 to receive routing and content delivery reachability information in routing protocol advertisements 114. BGP 100 may represent Interior BGP (IBGP) or Exterior BGP (EBGP). IGP 102 may represent Open Shortest Path First (OSPF), Routing Information Protocol (RIP), Intermediate System-to-Intermediate System (IS-IS), Interior Gateway Routing Protocol (IGRP), Enhanced IGRP (EIGRP), and/or IBGP. For example, RPD 98 may execute BGP 100 to receive prefixes that are reachable from a peer autonomous system in BGP UPDATE messages issued by BGP speakers of the peer autonomous system. As another example, RPD 98 may execute IGP 102 to receive routes for prefixes reachable by the entity served by CDNI device 70. In some instances, BGP 100 and IGP 102 include traffic engineering (TE) extensions and protocol advertisements received by RPD 98 may include TE information. In some instances, administrator 110 uses management interface 106 of control unit 72 to configure routes in configuration data 108 that specify prefixes on-net for the entity served by CDNI device 70.

Topology information base 104 of control unit 72 is a data structure that includes information regarding an entity topology, reachable prefixes, costs for various network links, and other information that may be used by ALTO server 73 to generate ALTO network and cost maps (e.g., network map 116 and cost map 118). Topology information base 104 may include one or more routing information bases. Topology information base 104 may include a traffic engineering database.

Management interface 106 (illustrated as mgmt. IF 106) of control unit 72 may represent a command-line interface (CLI), a graphical user interface (GUI), a remote procedure call (RPC), or another interface to enable administrator 110 (illustrated as "admin. 110") to configure CDNI device 70 by adding, modifying, and/or deleting configuration data in configuration 108 (illustrated as "config. 108). Administrator 110 may represent a network operator of, e.g., an NSP network or CDN, or a software agent executing, e.g., on a network management device. Administrator 110 may configure in configuration 108 policies that reflect SLAs with other CDN providers, NSPs, or CSPs, as well as policies that specify quality of service or other service parameters for various subscribers using end user devices to access services provided by the entity served by CDNI device 70. Configuration data 108 may also include a community attribute map that maps community attribute values to corresponding PID attribute values or inter-PID costs. CDNI device 70 applies the policies to affect request routing and end user content delivery reachability and cost advertisement to accord with provider preferences relating to transmission costs, load balancing, service-discrimination, PID grouping (aggregation), prefix attributes (e.g., on-net, delay, price), or other preference areas.

CDNI device 70 may also include an ALTO client 74 to implement an aspect of CDNI interfaces to receive one or more ALTO-based downstream network maps 76 and downstream cost maps 78 from other CDNI devices in update messages 80. ALTO client 74 may represent any of ALTO clients 48 of FIG. 3. ALTO client 74 may communicate with ALTO servers of other CDNI devices using Simple Object Access Protocol (SOAP) or other eXtensible Markup Language (XML) interfaces, a CLI, Simple Network Management Protocol (SNMP), Remote Procedure Calls (RPCs), and a Common Object Request Broker Architecture (CORBA) interface, for example.

ALTO server 73 may represent an example instance of any of ALTO server 46 of FIG. 3. ALTO server 73 uses topology information base 104, configuration data 108, and/or downstream network maps 76 and downstream cost maps 78 to generate network map 116 and cost map 118 that describe a content delivery reachability topology according to the techniques described herein. For example, ALTO server 73 may incorporate topologies of downstream entities described in downstream network maps 76 into a topology of the entity served by ALTO server 73 that is stored in topology information base 104 to generate network 116.

ALTO server 73 may represent prefixes described in topology information base 104 as prefix PIDs, surrogates specified in configuration 108 as surrogate PIDs, and itself (in its capacity as a request router) as a request router PID within network map 116. Network map 116 includes one or more PID entries that constitutes a data structure to store a corresponding one or more PIDs of the network map. Each PID entry may include one or more aggregated prefixes, network address, PID type (e.g., prefix, surrogate, or request router), and/or PID name, for example.

ALTO server 73 may use network map 116, topology information base 104, and/or configuration 108 to generate cost map 118 according to techniques described herein. Cost map 118 may include, for example, one or more cost map entries that each specifies two PIDs of network map 116 and an ALTO cost (a content delivery cost in this example) for the two PIDs. For example, ALTO server 73 applies policies in configuration 108 to network map 116 and, in some instances, topology information base 104 to generate corresponding cost map 118. Configuration 108 or PID attributes for PIDs of network map 116 dynamically generated using content delivery reachability information received in BGP UPDATE messages may affect determination by ALTO server 73 of inter-PID costs. For example, configuration 108 may include a policy directing ALTO server 73 to set to infinity inter-PID costs for PID pairs having PIDs that both include a PID attribute value of "host," which may indicate that the PIDs represent end user devices. In this example, an application using the ALTO service provided by ALTO server 73 that receives a content request from a host endpoint will therefore not select another host endpoint to serve the requested content. The application, in the form of a request router for example, may instead select a surrogate or a downstream request router. As another example, configuration 108 may include a policy specifying costs to prefix PIDs received in one of downstream network maps 76 from a downstream entity. The costs may reflect an SLA with the provider of the downstream entity.

ALTO server 73 advertises end user content delivery reachability and costs to implement an aspect of a CDNI interface by sending a copy of network map 116 and/or cost map 118 to ALTO client 112 in upload message 115. ALTO server 73 may communicate with ALTO client 112 using SOAP or other XML, a CLI, SNMP, RPCs, or a CORBA interface, for example. Upload message 115 may include an incremental or a complete update, as described in Raghunath et al. incorporated above.

In some examples of CDNI device 70, ALTO server 73 implements an endpoint cost service. When ALTO server 73 receives, from ALTO client 112, a list of end user devices represented in network map 116, ALTO server 73 returns an ordinally-ranked list of the endpoints or the costs, specified by cost map 118, between the endpoints and the client or between the end user devices and another specified node. Alternatively, ALTO server 73 may return costs between each of the end user devices and the client or between each of the endpoint and another specified source node.

CDNI device 70 also implements aspects of a CDNI interface using BGP-based techniques described herein to advertise end user content delivery reachability and costs. Specifically, CDNI BGP 84 of control unit 72 executes BGP to receive BGP UPDATE messages 82 that include prefixes reachable from respective entities that issued BGP UPDATE messages 82. BGP UPDATE payload 28 of FIG. 2 may be an example payload of any of BGP UPDATE messages 82. CDNI BGP 84 stores prefixes received in BGP UPDATE messages 82 to prefix database 86 in association with identifiers for respective downstream entities that issued the BGP UPDATE messages 82 and, in some instances, prefix cost attributes (e.g., on-net or other costs). The identifier for a downstream entity that issues any of BGP UPDATE messages 82 may be determined from a BGP attribute such as the NEXT_HOP or AS_PATH attributes.

An identifier for a downstream entity may be an autonomous system number, a network address or other identifier for a CDNI device or downstream request router, a CDN name, or a provider name, for example. Prefix database 86 may include an associative data structure such as a radix tree, Patricia tree, list, or table. An entry in prefix database 86 may thus associate an identifier for a downstream entity with a prefix reachable by the downstream entity and, in some instances, provides one or more cost attributes for the prefix. In some cases, prefixes reachable by the entity served by CDNI device 70 may be received by execution of an IGP or IBGP to receive routes for prefixes for which the entity served by CDNI device 70 is on-net. In some cases, administrator 110 may add routes for prefixes for which the entity served by CDNI device 70 is on-net to configuration 108. These prefixes may be stored to prefix database 86 with an indication that such prefixes are on-net, where such indication may be a prefix cost attribute. When CDNI BGP 84 receives a more optimal entity to deliver content for a prefix in one of BGP UPDATE messages 82, CDNI BGP 84 may modify prefix database 86 to replace a previous entry. For example, prefix database 86 may associate an identifier for an off-net CDN for a prefix. Upon receiving one of BGP UPDATE messages 82 that specifies the prefix and an on-net CDN, CDNI BGP 84 may replace the entry in prefix database 86 with a new entry associating the prefix with the on-net CDN.

Where CDNI device 70 serves a downstream entity, CDNI BGP 84 may additionally provide end user content delivery reachability and cost information in the form of outbound BGP UPDATE messages 83 to upstream entities. BGP UPDATE payload 28 of FIG. 2 may be one example payload of any of outbound BGP UPDATE messages 83. CDNI BGP 84 reads advertises prefixes in prefix database 86, generates outbound BGP UPDATE messages 83, and sends BGP UPDATE messages 83 to upstream entities. CDNI BGP 84 may apply policies in configuration 108 that define a level of granularity for prefix aggregation and prefix cost attributes, for example, to be advertised. CDNI BGP 84 may add an AS number for the entity served by CDNI device 70 to AS_PATH attributes and/or may set a network address for CDNI device 70 or another request router of the entity as NEXT_HOP attributes of BGP UPDATE messages 83. In this way, CDNI BGP 84 provides an identifier for the entity served by CDNI device 70 to upstream entities to which CDNI device 70 advertises content delivery reachability information. CDNI BGP 84 may add on-net attributes or other prefix cost attributes to BGP UPDATE messages 83. Where the entity served by CDNI device 70 is on-net for a prefix, for example, CDNI BGP 84 sets an on-net attribute value to indicate this in a BGP UPDATE message 83 for the prefix.

CDNI BGP 84 is illustrated as separate from RPD 98 to indicate that end user content delivery reachability advertisements for CDNI in accordance with techniques described herein may be "out of band" to the routing plane of the network. That is, whereas RPD 98 may execute BGP 100 as part of a routing process for a CDNI device 70 that also receives routing protocol advertisements, CDNI BGP 84 may in some instances peer only with other CDNI devices and not with border or other BGP routers that make up the routing plane of the network. In this way, CDNI BGP 84 may avoid corrupting the BGP routing table with end user content delivery reachability information specifically for use by CDNs and CSPs. In some examples, however, CDNI BGP 84 may be subsumed within BGP 100 and executed in the routing plane. CDNI BGP 84 may distinguish BGP UPDATE messages for CDNI using a community or other BGP attribute.

In this example, request router 88 of CDNI device 70 implements a request routing aspect of a CDNI interface. Request router 88 receives content requests from client applications executing on an end user device (e.g., content request 94 from application 92 executing on end user 90) or redirected from another request router and determines an optimal surrogate or downstream entity to service the content request for application 92. In cases where request router 88 identifies a surrogate to service the content request, request router 88 sends redirect message 96 that includes a network address of the surrogate to application 92. Redirect message 96 may be a DNS reply or HTTP redirect, for instance. In cases where request router 88 determines a downstream entity to service the content request, request router 88 may forward the content request to the request router of the downstream entity. End user 90 may represent any of end users 10 of FIG. 1, and application 92 may represent a web browser, VoD player or other video player, set-top box software, a music player, or other application that requests and receives content from a network.

In determining an optimal surrogate or downstream entity to service the content request, request router 88 may use ALTO-based network map 116 and cost map 118 or prefix database 86, as available. For example, request router 88 may identify a network address for end user 90 that issued content request 94 from content request 94, look up the network address in prefix database 86, and redirect content request 96 to the look up value (e.g., a network address of a request router or a surrogate).

In some examples, request router 88 is deployed by a provider of the entity served by CDNI device 70 as a separate appliance (e.g., a separate device). In such examples, CDNI device 70 may provide content reachability and cost information received from downstream entities to request router 88 using a network link. Request router 88 routes content requests in accordance with the above techniques and may be considered an agent of CDNI device 70 and of the provider of the entity served by CDNI device 70 in such examples.

FIG. 5 is a block diagram illustrating an example graph 120 that represents a combined ALTO network map and cost map for network system 32 of FIG. 3 generated in accordance with techniques described herein. The ALTO network map and cost map represented by graph 120 may be generated by ALTO server 46B from the perspective of CDNI device 12B serving CDN 6B.

The illustrated PIDs represent network map PIDs, while edges connecting the PIDs represent inter-PID costs in the cost map (edge annotations indicate example inter-PID costs). Prefix PIDs 44A, 44B each encompass one or more prefixes for which a downstream entity provides content delivery reachability. In the case of prefix PID 44A, for example, downstream entity autonomous system 4A provides content delivery reachability. Because autonomous system 4A is not a CDN, such content delivery reachability is off-net and an indication that end user devices of prefix PID 44A exist and were advertised to an upstream entity with which autonomous system 4A has an agreement to receive and deliver content. In the case of prefix PID 44B, as another example, downstream entity CDN 6A/AS 4B advertises on-net reachability to end user devices of prefix PID 44A

Surrogates represented by PIDs 42A, 42B may serve content to respective end user devices of prefix PIDs 44A, 44B at the illustrated costs. In some examples, an ALTO server may generate multiple different ALTO cost maps for different cost attributes. In some examples, an ALTO server may generate a single ALTO cost map having inter-PID costs that are a combination of multiple cost attributes. In the illustrated example, an inter-PID cost (e.g., the cost between surrogate PID 42A and prefix PID 44A) is a scalar value that may represent a combination of a subset of any of the prefix costs attributes described above or any other metric that may affect selection of a downstream entity (or surrogate thereof) to service a content request.

Because, in this example, the CDN 6A provider does not expose the existence of surrogate 18A, request router PID 43 representing CDNI device 12A is the relevant node for selection for CDN 6A in its capacity as a downstream entity. Because CDNI device 12A is on-net for prefix 21B represented by prefix PID 44B in this example, the inter-PID cost between request router PID 43 and prefix PID 44B is zero. On-net costs may be non-zero in some examples, however, to conform to upstream entity provider policies.

In this example, PID 44A is not reachable from PID 43 because CDNI device 12E of AS 4A does not advertise prefix 21A content delivery reachability to CDNI device 12A over a CDNI interface. CDN 6A may therefore be prevented from being selected by upstream entities to deliver content to end users 10A, 10B having network addresses within prefix 21A despite there being a peering link 7 connecting AS 4A and AS 4B in FIG. 1 that enables network communication between CDN 6A and end users 10A, 10B.

Figure 6:
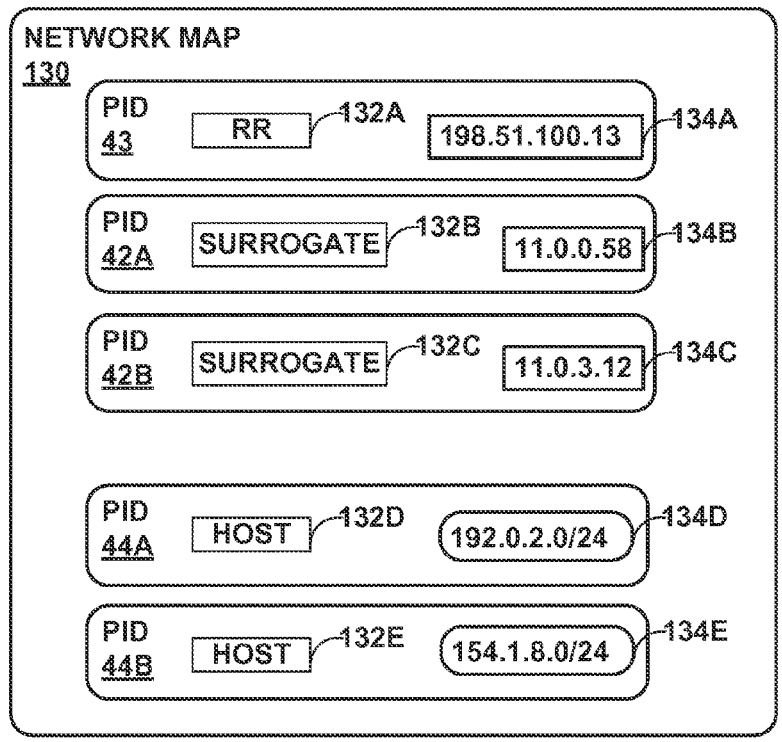
FIG. 6 is a block diagram illustrating an example application-layer traffic optimization network map that describes topologies for one or more downstream entities in accordance with techniques described in this disclosure.

FIG. 6 is a block diagram illustrating an example ALTO network map that describes topologies for one or more downstream entities in accordance with techniques described in this disclosure. Example network map 130 may represent a network map for network system 32 of FIG. 3, which in turn may represent at least a portion of network system 2 of FIG. 1, generated in accordance with techniques described herein. Network map 130 may be generated by ALTO server 46B from the perspective of CDNI device 12B serving CDN 6B. Network map 130 may be implemented as a table, list, database, or other associative data structure.

Network map 130 includes a set of PIDs 42A-42B, 43, and 44A-44B (collectively, "PIDs of network map 130"). Each of the PIDs of network map 130 constitutes an indirect and network-agnostic aggregation mechanism to represent, for instance, one or more individual endpoints, one or more subnets, metropolitan areas, points of presence ("PoPs"), one or more autonomous systems, a content delivery network, a request router, a surrogate, or any combination thereof. For instance, PID 43 represents a request router having IP address 198.51.100.13.

PID 44A is associated with prefix 134D corresponding to subnet 21A of FIG. 1. Similarly, PID 44B is associated with prefix 134E corresponding to subnet 21B of FIG. 1. As another example, PID 42A represents a surrogate having network address 192.51.100.13. Each of the PIDs of network map 130 includes a respective one of PID-type fields 132A-132E that stores a PID attribute value for the PID. For instance, PID 43 includes PID-type field 132A that specifies a "RR" PID-type for PID 43, while PID 42A includes PID-type field 132B that specifies a "surrogate" PID-type for PID 132B. PID 32 thus identifies an endpoint that is a request router and PID 42A identifies an endpoint that is a surrogate. PIDs 44A, 44B have respective PID-type fields 132D, 132E identifying PIDs 44A, 44B has hosts, which indicates to request routers and ALTO servers that prefixes 134D, 134E include end user devices to receive content. Further example details regarding specifying and using a PID type for PIDs can be found in Medved et al., U.S. patent application Ser. No. 12/861,671, entitled "APPLICATION-LAYER TRAFFIC OPTIMIZATION SERVICE ENDPOINT TYPE ATTRIBUTE," filed Aug. 23, 2010, the entire contents of which are incorporated herein by reference.

PID-type fields 132 are attributes of respective PIDs of network map 130 and enable an ALTO service to take PID attribute value-specific actions. PID attribute values may be passed by an ALTO server as a constraint to a map filtering service. For example, an ALTO server, such as ALTO server 73 of FIG. 4, may set cost entries of an cost map that specify costs between two PIDs of type "host" to a value of infinity. An upstream entity using the cost map to select a resource for a requesting end user device may thus avoid selecting another host as a resource in favor of a resource with a PID of type "surrogate" or "RR" (request router).

Figure 7:
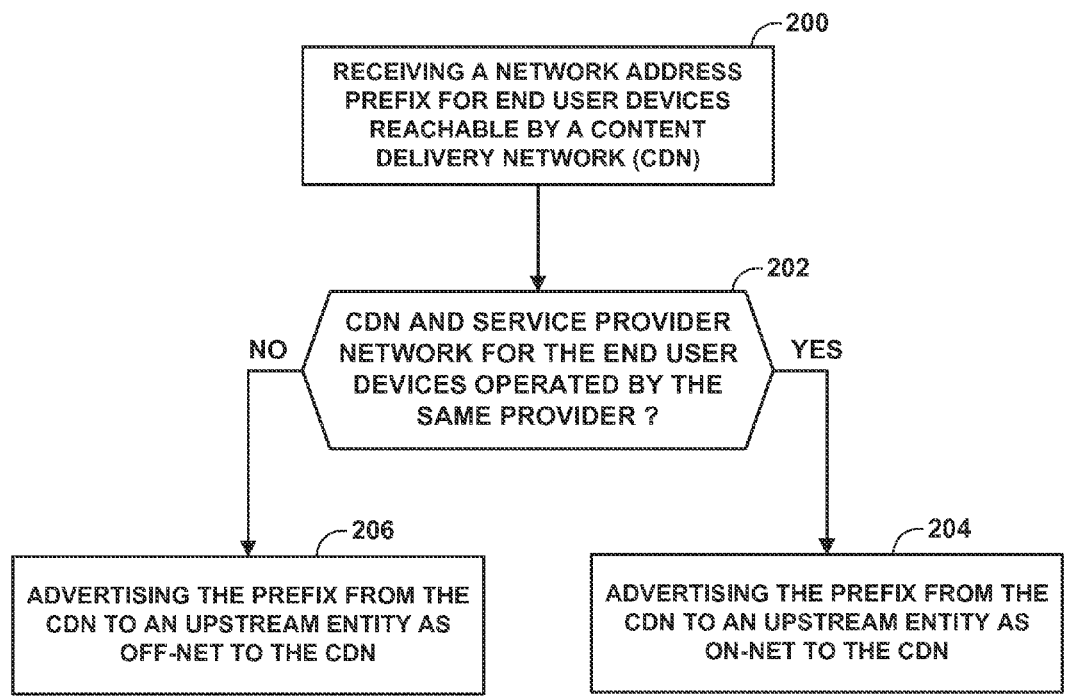
FIG. 7 is a flow diagram illustrating an example mode of operation for a CDNI device to advertise content delivery reachability and cost information for a content delivery network to an upstream entity according to techniques described in this disclosure.

FIG. 7 is a flow diagram illustrating an example mode of operation for CDNI device 70 of FIG. 4 to advertise content delivery reachability and cost information for a content delivery network to an upstream entity according to techniques described in this disclosure. CDNI BGP 84 serving a content delivery network receives a network address prefix encompassing end user devices that receive content services from the content delivery network (220). The network address prefix may be configured by administrator 110 in configuration 108 or received in BGP UPDATE messages 82 from a downstream entity. When the provider for the content delivery network is also the network service provider for the end user devices (YES branch of 202), CDNI BGP 84 advertises the network address prefix to an upstream entity with a BGP attribute indicating the network address prefix is on-net for the content delivery network (204). CDNI BGP 84 may determine whether the network address prefix is on-net by querying prefix database 86 associating the network address prefix with a prefix cost attribute specifying whether the network address prefix is on-net. CDNI BGP 84 may also determine whether the network address prefix is on-net by reading configuration data for the network address prefix in configuration 108 specifying whether the network address prefix is on-net. If, however, the content delivery network is operated by an entity other than the network service provider for the end user devices, CDNI BGP 84 advertises the network address prefix to an upstream entity with a BGP attribute indicating the network address prefix is off-net for the content delivery network (206).

Figure 8:
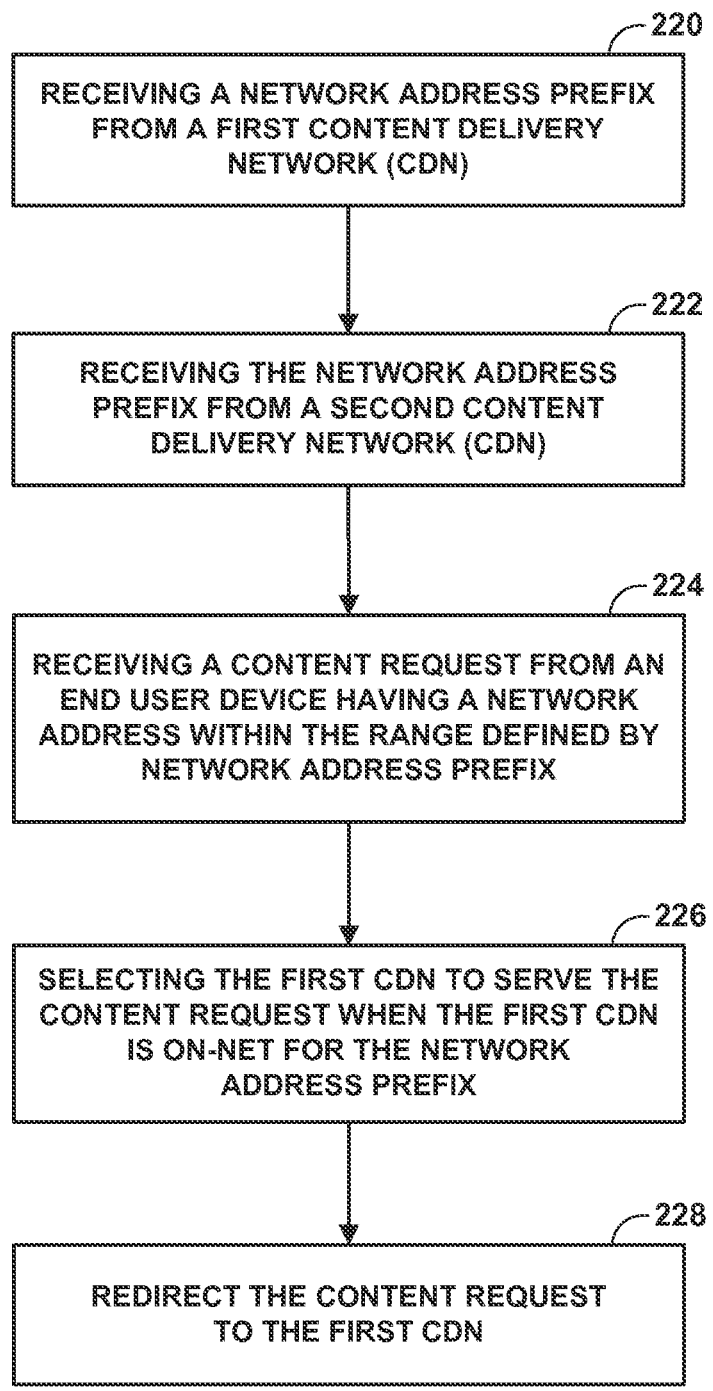
FIG. 8 is a flow diagram illustrating an example mode of operation for a CDNI device to select a downstream content delivery network to serve a content request in accordance with techniques described in this disclosure.

FIG. 8 is a flow diagram illustrating an example mode of operation for CDNI device 70 of FIG. 4 to select a downstream content delivery network to serve a content request in accordance with techniques described in this disclosure. CDNI BGP 84 receives a network address prefix in BGP UPDATE messages 82 from a downstream entity that is a first content delivery network (220). CDNI BGP 84 also receives the network address prefix in BGP UPDATE messages 82 from a different downstream entity that is a second content delivery network (222). Request router 88 receives content request 94 from application 92 executing on end user device 90 (224). In this instance, end user device 90 has a network address that is within the network address range defined by the network address prefix.

CDNI device 70 receives BGP UPDATE messages indicating the network address prefix is reachable from both a first content delivery network and a second content delivery network. However, request router 88 selects the first content delivery network rather than the second content delivery network to serve the content request when the first content delivery network is on-net for the network address prefix that includes end user device 90 (226). In this way, request router 88 selects a content delivery network that is established by an NSP to serve end user device 90 and other end user devices in the NSP network. Request router 88 redirects the content request to the first content delivery network by sending, to application 92, redirect message 96 that may includes a network address of a surrogate or request router of the first content delivery network (228).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
receiving, with a content delivery network interconnection (CDNI) device of a content serving entity, a prefix advertisement that indicates a content delivery network that provides content delivery reachability to a network address prefix,
wherein the prefix advertisement includes an on-net attribute field that indicates the content delivery network is on-net for the network address prefix and is administered by a provider that also administers an autonomous system that provides network reachability to the network address prefix;
receiving, with the CDNI device, a content request that includes a request for content and specifies a network address of an end user device to receive the content, wherein the network address is within a range defined by the network address prefix;
determining, with the CDNI device and based on the on-net attribute field of the prefix advertisement, the content delivery network is on-net for the network address of the end user device;
with the CDNI device and in response to determining the content delivery network is on-net for the network address of the end user device, selecting the content delivery network to serve the content request; and
redirecting the content request from the CDNI device to the content delivery network.

2. The method of claim 1,
wherein the content serving entity operates over a network that includes an autonomous system border router,
wherein the autonomous system border router receives a routing protocol advertisement that is distinct from the prefix advertisement and that associates the autonomous system with the network address prefix.

3. The method of claim 1, wherein the prefix advertisement is a first prefix advertisement and the content delivery network is a first content delivery network, the method further comprising:
receiving a second prefix advertisement with the CDNI device, wherein the second prefix advertisement indicates a second content delivery network provides content delivery reachability to the network address prefix, wherein the second prefix advertisement includes an on-net attribute field that indicates the second content delivery network is off-net for the network address prefix and is not administered by the provider that administers the autonomous system that provides network reachability to the network address prefix.

4. The method of claim 1, wherein the content delivery network is administered by a content service provider.

5. The method of claim 1, wherein the prefix advertisement comprises a Border Gateway Protocol UPDATE message that includes Network Layer Reachability Information (NLRI) that specifies the network address prefix.

6. The method of claim 5, wherein the on-net attribute field comprises a prefix attribute for the NLRI.

7. The method of claim 1, wherein the prefix advertisement comprises an application layer traffic optimization network map a cost map that describe a content delivery reachability topology for the content delivery network.

8. The method of claim 1, further comprising:
aggregating, with the CDNI device, the network address prefix with an additional network address prefix to generate an aggregated network address prefix; and
sending the aggregated network address prefix from the CDNI device to an upstream entity.

9. A method comprising:
receiving, with a content delivery network interconnection (CDNI) device of a content serving entity, an application-layer traffic optimization network map and a cost map that describe a content delivery reachability topology for a content delivery network and indicate the content delivery network provides content delivery reachability for a network address prefix, wherein the network map includes a prefix provider-defined identifier (PID) that specifies the network address prefix and includes a PID for a device of the content delivery network;
receiving, with the CDNI device, a content request that includes a request for content and specifies a network address of an end user device to receive the content, wherein the network address is within a range defined by the network address prefix;
selecting, with the CDNI device and based at least on the prefix PID and the PID for the device of the content delivery network, the device of the content delivery network to serve the content request; and
redirecting the content request from the CDNI device to the device of the content delivery network.

10. The method of claim 9, wherein the content delivery network comprises an autonomous system that provides network reachability to the network address prefix.

11. The method of claim 9, wherein the PID for the device of the content delivery network comprises a surrogate PID that specifies the device comprises a surrogate of the content delivery network that stores and sources content in response to content requests, wherein redirecting the content request from the CDNI device to the device of the content delivery network comprises sending a redirect message that specifies the surrogate to source the content.

12. The method of claim 9, wherein the PID for the device of the content delivery network comprises a request router PID that specifies the device comprises a request router of the content delivery network that handles content requests, wherein redirecting the content request from the CDNI device to the device of the content delivery network comprises forwarding the content request to the request router.

13. A method comprising:
determining, with a content delivery network interconnection (CDNI) device that serves a content delivery network, that a provider that administers the content delivery network also administers an autonomous system that provides network reachability to a network address prefix;
generating, with a content delivery network interconnection (CDNI) device that serves a content delivery network, a prefix advertisement that indicates the content delivery network provides content delivery reachability to the network address prefix, wherein the prefix advertisement includes an on-net attribute field that indicates the content delivery network is on-net for the network address prefix and serves content to one or more end user devices having network addresses in the network address prefix using the content delivery network administered by the provider; and
sending the prefix advertisement from the CDNI device to a content serving entity.

14. The method of claim 13, wherein the autonomous system comprises an autonomous system border router that sends, to the content serving entity, a routing protocol advertisement that is distinct from the prefix advertisement.

15. The method of claim 13, wherein the content delivery network is administered by a content service provider.

16. The method of claim 13, wherein the prefix advertisement comprises a Border Gateway Protocol UPDATE message that includes Network Layer Reachability Information (NLRI) that specifies the network address prefix.

17. The method of claim 16, wherein the on-net attribute field comprises a prefix attribute for the NLRI.

18. The method of claim 13,
wherein the prefix advertisement comprises an application layer traffic optimization network map and cost map that describe a content delivery reachability topology for the content delivery network.

19. The method of claim 13, further comprising:
executing a routing protocol with the CDNI device to receive layer three (L3) network reachability information defining a route to the network address prefix.

20. The method of claim 13, further comprising:
receiving a content request with the CDNI device, wherein the content request specifies a network address of an end user device that is within a range defined by the network address prefix; and
selecting a surrogate of the content delivery network to serve content requested in the content request; and
redirecting the content request from the CDNI device to the surrogate.

21. A method comprising:
generating, with a content delivery network interconnection (CDNI) device that serves a content delivery network, an application-layer traffic optimization network map and cost map that describe a content delivery reachability topology for a content delivery network and indicate the content delivery network provides content delivery reachability for a network address prefix, wherein the network map includes a prefix provider-defined identifier (PID) that specifies the network address prefix and includes a PID for a device of the content delivery network;
sending the network map and cost map from the CDNI device to a content serving entity.

22. The method of claim 21, wherein the content delivery network comprises an autonomous system that provides network reachability to the network address prefix.

23. The method of claim 22,
wherein the autonomous system comprises an autonomous system border router that sends, to the content serving entity, a routing protocol advertisement that is distinct from the network map and cost map.

24. The method of claim 21, wherein the PID for the device of the content delivery network comprises a surrogate PID that specifies the device comprises a surrogate of the content delivery network that stores and sources content in response to content requests.

25. The method of claim 21, wherein the PID for the device of the content delivery network comprises a request router PID that specifies the device comprises a request router of the content delivery network that handles content requests.

26. The method of claim 21, further comprising:
receiving a content request with the CDNI device, wherein the content request specifies a network address of an end user device that is within a range defined by the network address prefix; and
based at least on the network map and cost map, selecting a surrogate of the content delivery network to serve content requested in the content request; and
redirecting the content request from the CDNI device to the surrogate.

27. A content delivery network interconnection (CDNI) device of a content serving entity, the CDNI device comprising:
a control unit comprising one or more processors, wherein the control unit is configured to receive a prefix advertisement that indicates a content delivery network provides content delivery reachability to a network address prefix,
wherein the prefix advertisement includes an on-net attribute field that indicates the content delivery network is on-net for the network address prefix and is administered by a provider that also administers an autonomous system that provides network reachability to the network address prefix;
a request router of the control unit configured to receive a content request that includes a request for content and specifies a network address of an end user device to receive the content, wherein the network address is within a range defined by the network address prefix,
wherein the request router is further configured to, based on the on-net attribute field of the prefix advertisement, determine the content delivery network is on-net for the network address of the end user device, and
wherein the request router is further configured to, in response to determining the content delivery network is on-net for the network address of the end user device, select the content delivery network to serve the content request based at least on the content delivery reachability indication and redirect the content request to the content delivery network.

28. The CDNI device of claim 27, wherein the prefix advertisement comprises a Border Gateway Protocol (BGP) UPDATE message that includes Network Layer Reachability Information (NLRI) that specifies the network address prefix, the CDNI device further comprising:
a prefix database;
a CDNI BGP module configured to execute BGP to receive the BGP UPDATE message and store an association of the network address prefix and the downstream entity to the prefix database,
wherein, to determine the content delivery network is on-net for the network address of the end user device, the request router is further configured to query the prefix database to select the content delivery network.

29. The CDNI device of claim 27, wherein the prefix advertisement comprises an application-layer traffic optimization network map and cost map that describe a content delivery reachability topology for the content delivery network, the CDNI device further comprising:
an application-layer traffic optimization client configured to receive the application-layer traffic optimization network map and cost map.

30. The CDNI device of claim 27,
wherein the CDNI device further comprises a routing protocol daemon configured to a routing protocol to receive a layer three (L3) routing protocol advertisement that is distinct from the prefix advertisement and that associates the network address prefix with an autonomous system that provides network reachability to the network address prefix.

31. A content delivery network interconnection (CDNI) device of a content serving entity, the CDNI device comprising:
a control unit comprising one or more processors, wherein the control unit is configured to receive an application-layer traffic optimization network map and cost map that describe a content delivery reachability topology for a content delivery network and indicate the content delivery network provides content delivery reachability for a network address prefix, wherein the network map includes a prefix provider-defined identifier (PID) that specifies the network address prefix and includes a PID for a device of the content delivery network;
a request router of the control unit configured to receive a content request that includes a request for content and specifies a network address of an end user device to receive the content, wherein the network address is within a range defined by the network address prefix,
wherein the request router is further configured to, based at least on the prefix PID and the PID for the device of the content delivery network, select the device of the content delivery network to serve the content request, and
wherein the request router is further configured to redirect the content request to the device of the content delivery network.

32. The CDNI device of claim 31,
wherein the PID for the device of the content delivery network comprises a surrogate PID that specifies the device comprises a surrogate of the content delivery network that stores and sources content in response to content requests,
wherein the request router is configured to redirect the content request to the device of the content delivery network by sending a redirect message that specifies the surrogate to source the content.

33. The CDNI device of claim 31,
wherein the PID for the device of the content delivery network comprises a request router PID that specifies the device comprises a request router of the content delivery network that handles content requests,
wherein the request router is configured to redirect the content request to the device of the content delivery network by forwarding the content request to the request router.

34. The CDNI device of claim 31, wherein the content serving entity comprises an autonomous system that provides network reachability to one or more additional network address prefixes, the CDNI device further comprising:

a topology information base;

a routing protocol daemon configured to execute a routing protocol to receive layer three (L3) routing protocol advertisements that include routing information describing an internal topology of the content serving entity and include network reachability information for the additional network prefixes, wherein the routing protocol daemon stores the routing information to the topology information base; and an application-layer traffic optimization server configured to generate an additional application-layer traffic optimization network map and cost map for the content serving entity and send the additional application-layer traffic optimization network map and cost map to an upstream entity, wherein the additional application-layer traffic optimization network map includes one or more additional prefix PIDs that specify the network address prefix and the additional network address prefixes.

35. A content delivery network interconnection (CDNI) device that serves a content delivery network, the CDNI device comprising:

a control unit comprising one or more processors, wherein the control unit is configured to determine that a provider that administers the content delivery network also administers an autonomous system that provides network reachability to a network address prefix, wherein the control unit is configured to generate a prefix advertisement that indicates the content delivery network provides content delivery reachability to the network address prefix, wherein the prefix advertisement includes an on-net attribute field that indicates the content delivery network is on-net for the network address prefix and serves content to one or more end user devices having network addresses in the network address prefix using the content delivery network administered by the provider, and wherein the control unit is configured to send the prefix advertisement to a content serving entity.

36. The CDNI device of claim 35, further comprising:

a request router of the control unit configured to receive a content request that includes a request for content and specifies a network address of an end user device to receive the content, wherein the network address is within a range defined by the network address prefix, wherein the request router is configured to select a surrogate of the content delivery network to source the content requested in the content request, and wherein the request router is configured to redirect the content request to the surrogate.

37. The CDNI device of claim 35, further comprising:

a CDNI Border Gateway Protocol (BGP) module configured to execute BGP to generate a BGP UPDATE message, wherein the prefix advertisement comprises the BGP UPDATE message that includes Network Layer Reachability Information (NLRI) that specifies the network address prefix.

38. The CDNI device of claim 35, further comprising:

a CDNI Border Gateway Protocol (BGP) module configured to execute BGP to receive a BGP UPDATE message that includes the network address prefix.

39. The CDNI device of claim 35, further comprising:

an application-layer traffic optimization server configured to generate an application-layer traffic optimization network map and cost map that describe a content delivery reachability topology for the downstream entity, wherein the prefix advertisement comprises the application-layer traffic optimization network map and cost map.

40. The CDNI device of 39, the CDNI device further comprising:

a topology information base; and a routing protocol daemon configured to execute a routing protocol to receive one or more layer three (L3) routing protocol advertisements that include routing information describing an internal topology of the content serving entity and that include network reachability information for the network address prefix, wherein the routing protocol daemon is configured to store the routing information to the topology information base, wherein the application-layer traffic optimization server is configured to generate the application-layer traffic optimization network map and cost map based at least on the routing information.

41. A content delivery network interconnection (CDNI) device of a content serving entity, the CDNI device comprising:

a control unit comprising one or more processors, wherein the control unit is configured to generate an application-layer traffic optimization network map and cost map that describe a content delivery reachability topology for a content delivery network and indicate the content delivery network provides content delivery reachability for a network address prefix, wherein the network map includes a prefix provider-defined identifier (PID) that specifies the network address prefix and includes a PID for a device of the content delivery network, wherein the control unit is further configured to send the network map and cost map from the CDNI device to a content serving entity.

42. The CDNI device of 41, wherein the PID for the device of the content delivery network comprises a surrogate PID that specifies the device comprises a surrogate of the content delivery network that stores and sources content in response to content requests.

43. The CDNI device of 41, wherein the PID for the device of the content delivery network comprises a request router PID that specifies the device comprises a request router of the content delivery network that handles content requests.

* * * * *